Nov. 3, 1931.  J. REID  1,830,717
ECCENTRIC DRIVING GEAR
Original Filed June 25, 1927
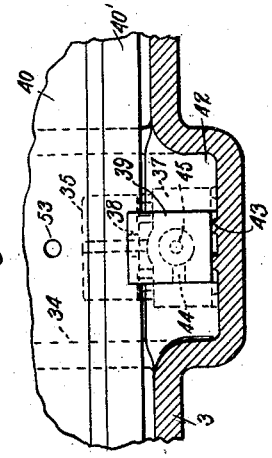
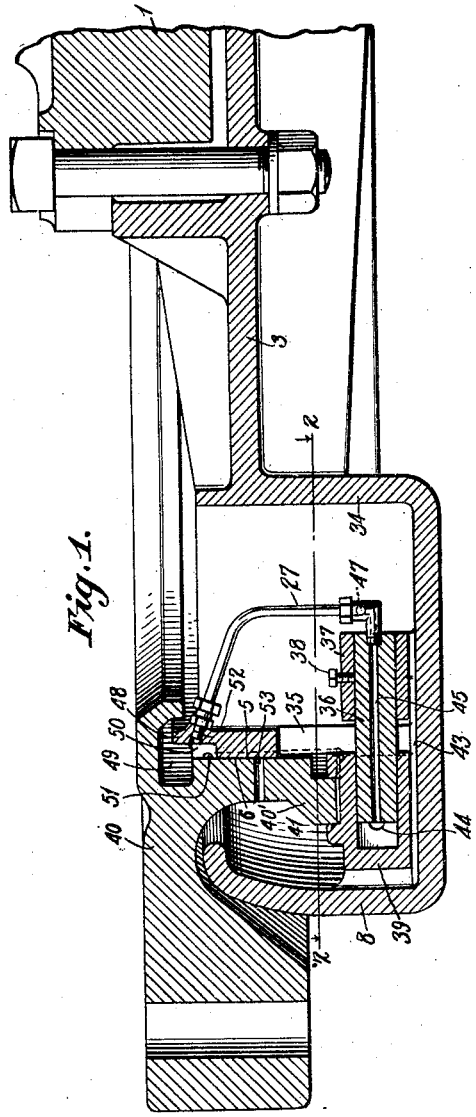
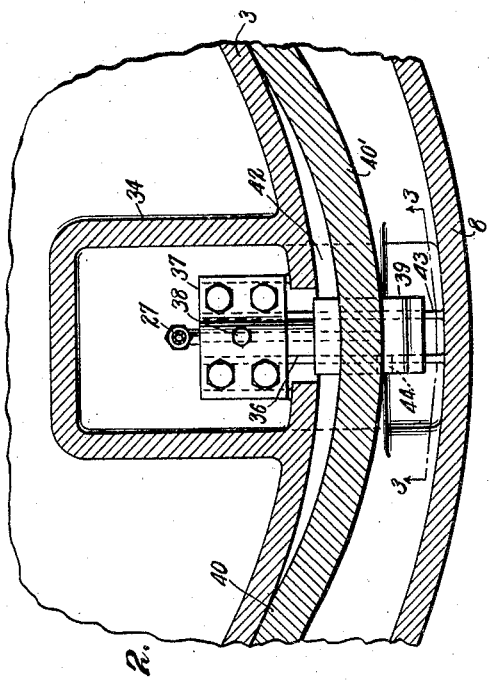
Inventor
*John Reid*
By *Knight Bros*
Attorney Patented Nov. 3, 1931

1,830,717

UNITED STATES PATENT OFFICE

JOHN REID, OF OIL CITY, PENNSYLVANIA, ASSIGNOR TO JOSEPH REID GAS ENGINE COMPANY, OF OIL CITY, PENNSYLVANIA

ECCENTRIC DRIVING GEAR

Original application filed June 25, 1927, Serial No. 201,412. Divided and this application filed March 1, 1930. Serial No. 432,532.

This invention relates to horizontal eccentric driving gears such as are used in pumping plants, and particularly to a means for providing adequate lubrication for the same while preventing the scattering of lubricating oil.

In the usual construction at the present time there is nothing but a low lip around the periphery of the eccentric to prevent the lubricating oil from being thrown off by centrifugal force from the lower edge of the eccentric after passing down between the bearing surfaces. Any excess oil is thrown toward the portion of this lip furthest removed from the center of rotation and spills over the edge. It is difficult to regulate the supply of oil so that there will be sufficient to properly lubricate the bearing surfaces without having some spilling over the above mentioned lip.

According to the present invention the lip is extended upward to substantially the height of the bearing surfaces, and is preferably curved inward at the top, thus forming a ring shaped cup of adequate proportions for catching the oil discharging from the lower edges of the bearing surfaces.

Most of the oil is thrown by centrifugal force to that portion of the cup furthest removed from the center of rotation of the eccentric, and forms there a relatively deep pool. In accordance with another feature of the invention I provide a pump having an intake terminating in this deep pool of oil and a delivery tube for supplying oil to the bearing surfaces. I am therefore able to supply the bearing surfaces with a continuous flow of oil and thereby obtain maximum efficiency of lubrication. The pump is conveniently operated by means of a cam surface on the eccentric ring, since the pump is secured to the eccentric and travels around the ring.

This application is a division of my co-pending application Serial No. 201,412 and its purpose is to cover one particular form of the invention described in the said co-pending application. Reference is made to the said co-pending application for a description of the general arrangement of the eccentric driving gear with which this invention is particularly adapted to be used. This description will be confined to the lubricating device and the parts of the eccentric driving gear with which it cooperates. In the drawings Fig. 1 is a vertical radial section of the outer portion of an eccentric and eccentric strap, showing the lubricating device.

Fig. 2 is a horizontal section on the line 2—2 of Fig. 1, and

Fig. 3 is a vertical section on the line 3—3 of Fig. 2.

To a driving member 1 is secured an eccentric 3 having a peripheral bearing surface 5 surrounded by the bearing surface 6 of eccentric ring 40. The eccentric has an outwardly and upwardly extending lip 8 arranged to catch the lubricating oil thrown out by centrifugal force from the lower end of bearing surfaces 5, 6. At the part of the eccentric furthest removed from its axis (not shown) is a basin 34 extending from the inner side of the lip 8 under the lower edge of eccentric strap 40 and in behind the bearing surface 5 of the eccentric. The rim of the eccentric is provided with an opening 35, in which is mounted a pump consisting of a stationary plunger 36, secured in a bracket 37 by a set screw 38, and a cylinder 39 slidably mounted on the plunger. Cylinder 39 lies under the lower edge of eccentric ring 40 and is provided with a slot 41 which engages said lower edge. The lower edge of the eccentric ring is formed with one or more eccentric portions 40' which gradually slope into the concentric portions. The slot 41 follows the undulations of the lower edge of the eccentric ring as the eccentric rotates and causes the cylinder to reciprocate. The cylinder is guided by flanges 42 and ribs 43. An intake opening 44 is provided in the cylinder and a longitudinal passage 45 in the plunger 36 leads to a delivery tube 27 in which is inserted a check valve 47. The intake opening 44 is controlled by the plunger 36.

The eccentric is extended upward at 48 a short distance above the top of the bearing surfaces 5, 6, thus forming a well 49 adapted to receive oil delivered by the pump. A recess 50 in the eccentric communicates with the well 49 and has oil grooves 51 radiating downwardly from it along the bearing surfaces. The delivery tube 27 terminates in a hole 52 leading into the recess 50. Holes 53 are spaced at suitable distances around the eccentric ring 40 to let off sufficient oil into the space enclosed by lip 8 to prevent oil from spilling over the extension 48.

The oil which is thrown out from the lower end of the bearing surfaces 5, 6 is caught by the lip 8 and thrown by centrifugal force into that end of the lip which is furthest removed from the center of rotation of the eccentric. There it forms a deep pool covering the intake opening of the pump, which sucks up the oil and forces it through the delivery tube to the recess 50 and well 49. The oil then runs through grooves 51 and thoroughly lubricates the bearing surfaces. Some of the oil is thrown out through holes 53 into the space enclosed by lip 8 and the number and size of the holes is so proportioned to the capacity of the pump that the oil is not permitted to rise in well 49 sufficiently high to spill over extension 48.

Having described my invention, I claim:—

1. In combination with a horizontal eccentric driving gear, comprising an eccentric and an eccentric ring cooperating therewith, and having a lip extending outwardly from the bottom of said eccentric and then upwardly to substantially the height of said eccentric; an oil pump mounted on said eccentric; a suction conduit for said pump opening into the space enclosed by said lip at the portion thereof furthest removed from the center of rotation of the eccentric; a delivery conduit for said pump communicating with the bearing surfaces of the eccentric and eccentric ring; the lower edge of said eccentric ring having an eccentric portion, and said pump having a reciprocable operating member provided with a recess in which said lower edge rides.

2. In combination with a horizontal eccentric driving gear, comprising an eccentric and an eccentric ring cooperating therewith, and having a lip extending outwardly from the bottom of said eccentric and the upwardly to substantially the height of said eccentric; an oil pump mounted on said eccentric at the portion furthest removed from its center of rotation, comprising a fixed plunger and a cylinder reciprocable on said plunger; said cylinder lying under the lower edge of said eccentric ring and having a recess in which said lower edge rides; said lower edge having an eccentric portion; an intake opening in said cylinder; an oil passage in said plunger; and a conduit connecting said passage with the bearing surfaces of the eccentric and eccentric ring.

The foregoing specification signed at Oil City, Pa., this 20th day of December, 1929.

JOHN REID.